J. A. OWENS.
Starch Tray.
No. 78,320.  Patented May 26, 1868.

United States Patent Office.

JOHN A. OWENS, OF LITTLE FALLS, NEW YORK.

Letters Patent No. 78,320, dated May 26, 1868.

IMPROVED STARCH-TRAYS.

*The Schedule referred to in these Letters Patent and making part of the same.*

TO ALL WHOM IT MAY CONCERN:

Be it known that I, JOHN A. OWENS, of Little Falls, in the county of Herkimer, and State of New York, have invented new and useful Improvements in the Trays used in the Manufacture of Starch; and I do hereby declare that the following is a full, clear, and exact description of the same, reference being had to the annexed drawing, making a part of this specification, which represents the invention in perspective.

A is the outer side.
B, the divisions.
C, the bottom.
D, curved ends.
E and F, cross-partitions.
F′ and F′ notches on the top of F.

In the manufacture of starch, the trays hitherto in use have been wholly of wood, with little regard to size or proportions, and consequently they perform inefficiently; thus, as there is a constant deposition of starch going on, the mass in the tray is lessened, and the capacity of the trays should gradually be lessened, to keep up a sufficient current through the whole extent to carry off the refuse, and the slope should be gradual from one end to the other, and just sufficient to keep the liquid flowing, without current sufficient to carry off any of the starch. Again, the ends of the divisions are always square, which gives too great a capacity at these points, and the liquid spreads out, and the refuse settles in the corners, and the purity of the starch is impaired. Another objection to the trays as used is, that the bottoms being of wood, and being constantly wet, the shovel used to take up the starch roughens it, and the fibres sticking up, cause eddies and deposits of the refuse with the starch.

I make my trays eight in number, each from thirty to forty feet in length, according to the room, and six inches deep, with a slope or pitch on the bottom, of one inch in forty feet. The upper or first tray should be eleven inches wide, and the others be diminished each half an inch less than the preceding one, to which it is united at the end. The ends of each adjacent pair are united with a curve, as seen in the drawings, which is so formed as to correspond with the diminished width of the last of the two.

The bottom is made or lined with sheet metal, as zinc, lead, sheet-iron, but galvanized iron will be found as good as anything.

At the upper end of the first tray, where the stock enters, is a cross-partition, E, and a little further on is another, F. These serve to collect and retain the sand and dirt, and prevent it from settling with the starch. On the upper edge of F are two notches or sluices, F′ F′, near the sides of the tray. The purpose of these is to keep up a larger flow at the sides than at the centre, for the reason that where the liquid enters from the spout there is usually a greater mass at the centre, which causes the refuse to run to and deposit at the sides, instead of being carried off.

The stock passes into the upper end of the first tray, and the sand and dirt, being heaviest, fall soonest to the bottom, and are retained by E. If any passes over E it is retained by F, and prevented from mixing with any of the starch deposited beyond. If any starch is deposited in E or F, it may be separated afterwards. The liquid, after passing E and F, passes slowly over the bottom of the first tray, depositing the starch as it flows along, and, maintaining a uniform surface, carries off all the lighter material. When it reaches the end of the first tray, instead of spreading out in the angles and grounding the refuse, as in the old form, it is gradually compressed into a narrower space in the second tray, by which the flow of the first tray is kept up, and so on until it reaches the front end of the last tray, when there is little or nothing but the water and refuse, which fall into the receptacle below, in the usual way. The pure starch may then be shovelled up from the smooth bottom with great readiness.

In addition to the advantages mentioned, the smooth bottom allows the whole to be thoroughly cleansed, and kept sweet, which a wooden bottom cannot be.

Having thus described my invention, what I claim therein as new, and desire to secure by Letters Patent, is—

1. Forming the bottoms of the trays of galvanized iron.
2. Forming the connected ends of each pair of trays with a curve, substantially as described, and for the uses and purposes mentioned.
3. The partitions E and F, one or both, for the uses and purposes mentioned.

JOHN A. OWENS.

Witnesses:
JOHN G. CROCKER,
ARTHUR M. BEARDSLEY.